United States Patent [19]
Pamer

[11] 3,873,075
[45] Mar. 25, 1975

[54] FLUID PRESSURE DEVICE
[75] Inventor: Karl A. Pamer, Chagrin Falls, Ohio
[73] Assignee: McNeil Corporation, Wickliffe, Ohio
[22] Filed: June 7, 1973
[21] Appl. No.: 367,761

Related U.S. Application Data
[63] Continuation-in-part of Ser. No. 308,808, Nov. 22, 1972, Pat. No. 3,819,219.

[52] U.S. Cl..................... 267/116, 267/35, 293/85, 293/88, 188/298
[51] Int. Cl. ........................ F16f 9/10, B60r 19/06
[58] Field of Search ............ 293/DIG. 2, 70, 85, 86, 293/88; 213/43; 188/284, 298, 312, 316; 267/35, 116, 121, 122, 123, 139, 140

[56] References Cited
UNITED STATES PATENTS
| | | | |
|---|---|---|---|
| 1,729,565 | 9/1929 | Caretta | 267/35 |
| 3,568,856 | 3/1971 | Knippel | 213/43 |
| 3,751,091 | 8/1973 | Renneker | 188/298 |

Primary Examiner—Lloyd L. King
Assistant Examiner—Robert Saifer
Attorney, Agent, or Firm—Watts, Hoffmann, Fisher & Heinke Co.

[57] ABSTRACT

A vehicle bumper support comprising two tubular telescopic assemblies, each including a transverse wall having an aperture therethrough, a first elastic tubular member within one of said assemblies at one side of the transverse wall thereof having one end sealed about the aperture through the wall and the other end closed. A second elastic tubular member more elastic than the first tubular member within the other of said assemblies and at the opposite side of the transverse wall of said one assembly. The second elastic member has one end sealed about the aperture through the transverse wall of said one assembly and its opposite end connected to the transverse wall of said other assembly and closed. The chambers formed at least in part by the elastic tubular members are filled with liquid flowable from one chamber to the other through the aforesaid aperture in the transverse wall of said one assembly as restricted by a rod-like member connected to the transverse wall of said other assembly and extending into said aperture. The rod-like member is of decreasing diameter in the direction of the transverse wall of said one assembly and varies the resistance to the flow of liquid from one chamber to the other. A ring-like flexible member exteriorly of said second flexible tubular member tapering outwardly and toward the transverse wall of said other assembly at the side of the transverse wall of said one assembly facing the transverse wall of said other assembly.

14 Claims, 3 Drawing Figures

FLUID PRESSURE DEVICE

RELATED APPLICATION

This application is a continuation-in-part of my copending application Ser. No. 308,808 filed Nov. 22, 1972, now U.S. Pat. No. 3,819,219, the disclosure of whch is incorporated herein by reference.

FIELD OF THE INVENTION

The invention relates to reciprocating-type fluid pressure devices and more specifically to hydraulic collision energy absorbing devices for movable objects, such as, on and/or off highway motor vehicles including recreational vehicles, movable material handling devices, for example, cranes, forklift trucks, etc.

PRIOR ART

Reciprocating-type fluid pressure devices including hydraulic energy absorbing devices of innumerable different designs are available but such devices leak fluid, are complicated in design, expensive to manufacture, unreliable in service, and/or require frequent maintenance, etc.

SUMMARY OF THE INVENTION

The present invention provides a novel and improved fluid pressure device of the reciprocating type including a hydraulic energy absorbing device, especially suited for connecting a vehicle collision bumper to the frame of the vehicle, comprising a limited number of parts that are simple in construction, require little if any precision machining, are otherwise inexpensive to manufacture, and can be readily assembled with one another. The device is reliable in operation and requires minimum maintenance.

The present invention further provides a novel and improved energy absorbing device of the character referred to comprising two interconnected sealed variable volume elastic liquid chambers of different elasticity in communication with one another through a restricted or metering opening. The elastic chambers eliminate fluid seals, discrete return springs, etc., and otherwise reduces the number of parts required and compensate for any inaccuracies therein, etc.

DESCRIPTION OF THE PREFERRED EMBODIMENT

Figure 1:
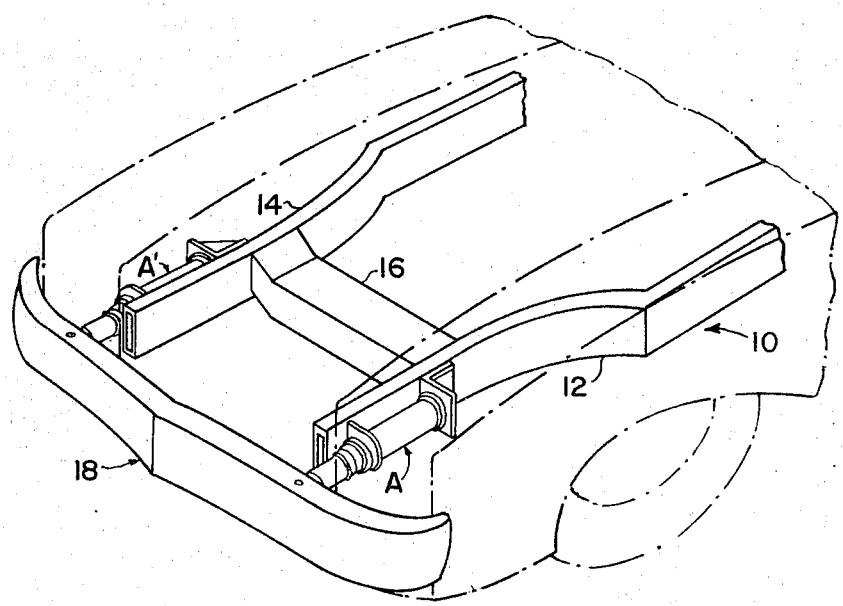
FIG. 1 is a fragmentary perspective view of the front end of a passenger automobile frame having a collision bumper connected thereto by a pair of energy absorbing devices embodying the present invention.
Figure 3:
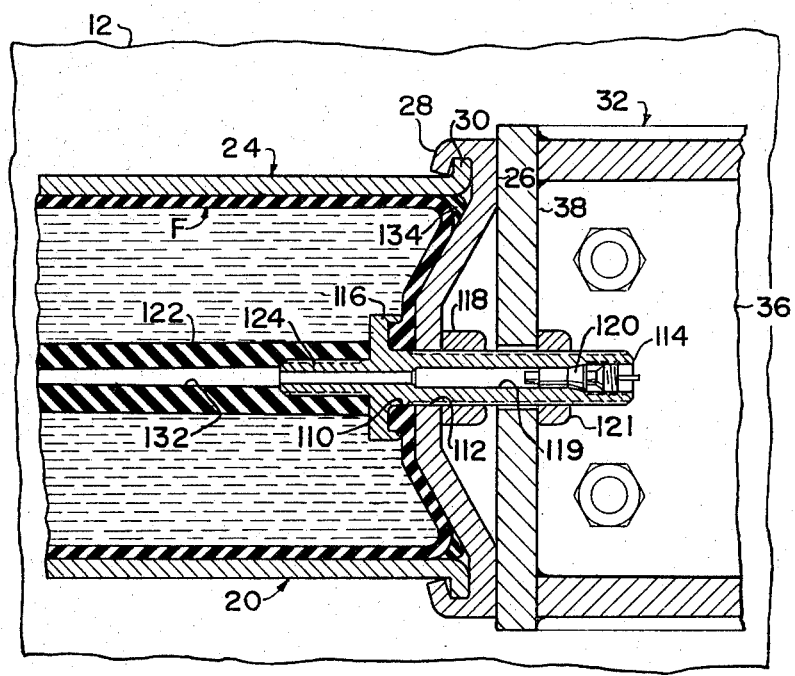
FIG. 3 is an enlarged view of a portion of FIG. 2.

Referring to the drawings, the reference character 10 designates generally an automobile chassis frame comprising a pair of rigid side frame rails, 12,14, interconnected adjacent to their forward end by a rigid crossmember 16. A collision bumper structure 18 is connected to the frame rails 12,14 by energy absorbing devices A,A' connected to the rails 12,14, respectively, and to the bumper 18 adjacent to its opposite ends.

Except for the reversal of orientation, the energy absorbing devices A,A' are structurally identical and merely the device A is shown in detail in the drawings and is herein described. The corresponding parts of device A', where they appear in the drawings or are herein referred to, are designated by the same reference characters as those employed in the description of device A but with a prime mark attached thereto.

The device A comprises telescopic tubular assemblies 20,22 having limited relative movement in the direction to extend the device thus permitting the vehicle of which the chassis 10 is a part to be towed by the bumper structure, if desired. The assembly 20 comprises a tubular member 24 having its right-hand end, as viewed in the drawings, closed but not sealed by a disc-like cap or member 26 secured thereto by having its peripheral edge part 28 spun over an external flange 30 on the end of the member 24. The member 24 and in turn the device A is secured to the side frame rail 12 of the automobile chassis frame by an angle bracket 32 and a mounting plate 34. The base 36 of the bracket 32 is detachably bolted or otherwise fixed to the rail 12 and the member 26 abuts against the side of another part 38 of the bracket. The plate 34 is welded to the rail 12 and is provided with a cylindrical aperture within which the member 24 is received and secured as by welding.

The assembly 22 comprises a tubular member 40 having a ring-like base 42 of a clevis-like member 44 adapted for connection to the bumper structure 18 fixed to its left end, as viewed in the drawings, having an annular axial flange 46 thereon spun over an external flange 48 on the adjacent end of the member 40. A section 60 of the right-hand end of the tubular member 40 is expanded or otherwise formed to a slightly larger diameter than the section 62 adjacent thereto and a short section 64 at the extreme left end of the tubular member 40 is of reduced diameter such that the flange 48 thereon does not extend outwardly beyond the section 62 of the member. The extreme left end of the member 24 for a short section 66 is of reduced size such that its interior diameter is about the same as the exterior diameter of the section 62 of the member 40 thus limiting movement of the assembly 22 outwardly of the assembly 20, that is, toward the left as viewed in the drawings.

The assembly 22 includes a collar-like member 70 comprising axially orientated sections 72,74 of different external diameters. The external diameter of section 72 is such that it slides freely and without looseness in the full diameter section 76 of the member 24 and the diameter of the section 74 is slightly larger than the internal diameter of section 60 of the member 40 and the member 70 is fixed to the right end of the member 40 by the section 74 thereof forced into the end of the member 40. A stepped partition or transverse wall member 80 having a central through aperture 82 is secured to the right end of the section 72 of the member 70 by having a portion 84 thereof of appropriate reduced diameter inserted into the adjoining end of the section 72 of the member 70 by a force fit.

The assembly 20 further includes two flexible, elastic members E,F of tubular configuration made of suitable elastomer material, such as a natural or synthetic rubber composition, preferably neoprene. The members E,F shown are made of the same composition and have different wall thickness to provide different elasticity characteristics. The member E, which is more difficult to stretch than the member F, is located within the members 40, 70 and has a closed left end. The open end is secured to the left-hand side of the partition member 80 by having an external flange 90 thereon, T-shaped in longitudinal cross-section, and the part adjacent thereto fixedly confined between the members 70,80. The approximate size and shape of the member F prior to the device being pressurized is shown in dot-dash lines in FIG. 2 and is about one-half its expanded size shown in full lines. The open left end of the member F is fixed to the right-hand side of the partition member 80 in a manner similar to that in which the open end of the member E is fixed to the left-hand side of the member 80 by having an external flange 92 thereon, T-shaped in longitudinal cross-section, fixedly clamped between the member 80 and a member 94, somewhat similar to the member 70, fixed to a section 96 of the member 80 of reduced diameter with a force fit. The construction is such that the members 40,70, 80,94 are freely slidable in the member 24 without noticeable looseness.

The right side of the member 94 that is the side facing the transverse end wall or cap 26 of the assembly 20 has a ring-like member 100 fixedly connected to the outer part thereof. The outside diameter of the member 100 fits the interior of the full diameter section 76 of the tubular member 24 with a sliding fit and its interior is tapered outwardly toward the wall 26 to provide a feather edge 102 at the right end thereof. When the member F is expanded against the interior wall of the member 24 it will expand the feather edge 102 of the member 100 into tight engagement with the interior of the member 24 and when the assembly 22 telescopes into the assembly 20 prevents the member F from being pinched and/or damaged by any clearance present between the exterior of the member 94 and the interior of the member 24. When the member 100 is made of suitable material such as Nylon, it can be manufactured to a diameter equal to the interior of the member 24 which enhances the support of the assembly 22 in the assembly 20.

The end of the tubular member F opposite from the end attached to the member 80 has a relatively small aperture 110 therein aligned with a second similar aperture 112 in the end wall or cap 26 of the assembly 20 and through which apertures a tubular valve stem 114, extends. A portion of the member F surrounding the aperture 110 is clamped against a flange 116 of the valve stem 114 by a nut 118 threaded on the valve stem 114 to the right or outer side of the member 26. This closes the right end of the member F. A stepped axial opening 119 through the valve stem 114 is normally closed by a suitable valve mechanism 120. The valve mechanism shown is similar to the valves employed in vehicle pneumatic tires. The valve stem 114 projects through an opening in the part 38 of the bracket 32 and the member 26 is held in engagement with the part 38 of the bracket by a nut 121 threaded onto the valve stem 114 to the rear or right of the part 32, as viewed in the drawings.

The size of the fluid orifice through the partition, formed by the member 80, dividing the interior of the device into right and left fluid chambers is controlled and varied as the assemblies 20,22 move relative to one another by a tapered tubular pin or rod-like member 122 threaded onto an extension 124 of the valve stem 114 at the left of the flange 116. The member 122 tapers toward the member 80, that is, it decreases in diameter from the right to left and decreases the size of the fluid orifice connecting the right and left chambers as the assembly 22 telescopes into the assembly 20. In the embodiment shown the member 122 is made of Nylon and will move freely in the aperture 82 in the member 80 even though the member is not perfectly centered with the aperture. The internal threads on the left end of the member 122 are preferably molded into the member at the time of its formation. The aperture 119 through the valve stem 114 communicates with the aperture 132 through the member 122 to provide means by which fluid may be supplied to the interior of the elastic members E,F.

In the embodiment shown the cap member 26 is concave as viewed from the right for strength reasons and the interior acute angle which is formed with the wall of the tubular member 24 is preferably relieved to prevent injury to that part of the member F adjacent thereto. As shown a washer 134 made of suitable material, for example, Nylon is placed in the right end of the member 24. The side of the washer 134 facing the member F is concave or curved inwardly providing feather edges in contact with the parts 24,26. The other side conforms to the adjacent parts of the members 24,26.

When the bumper 18 meets an obstruction, continued movement of the vehicle causes assembly 20 to move toward the left over assembly 22 with the members 40,80 telescoping within the member 24. This increases the pressure of the fluid within the right fluid chamber formed for the most part by the member F causing liquid therein to flow through the aperture 82 around the member 122 to the now low pressure chamber within the elastic member E. This occurs even though the member E is more difficult to stretch than the member F because the member F completely fills the chamber at the right of partition 80 in which it is located or housed and is incapable of further stretching. In fact the member F contracts lengthwise upon movement of assembly 20 towards the left relative to assembly 22. The feather edge of the ring-like member 100 prevents the elastic member F from being pinched and otherwise damaged by the movement of the assembly 20 over the assembly 22. The amount of energy absorbed is a function of the pressure drop in the liquid orifice between the high and low pressure liquid chambers and as the assembly 20 moves to the left the member 122 moves lengthwise through the aperture 82 and the orifice between the now high and low pressure chambers gradually decreases, thus increasing the resistance to the flow of liquid therethrough and movement of the assembly 20 over the assembly 22. The constructions of the members E and F are such that it is more difficult to stretch the member E than the member F and the size of the interior of that part of the assembly 22 in which the member E is housed is such that there is adequate room for unobstructed expansion of the member E due to the flow of fluid thereto from the left or now high pressure chamber. When the load is removed from the bumper structure 18 the elasticity of the member E causes fluid therein to flow to the chamber at the right of the partition 80 and is sufficient to cause the member E to completely fill the interior of the part of assembly 22 in which it is housed and the assemblies 20,22 to return to their original normal operating relative positions.

In assembling the device shown, the elastic member E may first be assembled with the valve stem 114 and the end member or cap 26 and secured together by the nut 120. The member 122 may then be attached to the extension 124 of the valve stem and the other end of the flexible member F fixed to the member 80 by the member 94 which had the ring member 100 attached thereto. The flexible member E can then be attached to the member 80 by the member 70 while submerged in liquid. This fills the subassembly of the two elastic member E, F. etc., with liquid and avoids the presence of any air therein. The part 40 can subsequently by assembled with the part 70 and the parts thus far assembled inserted from the right into the tubular member 24. Thereafter the member 26 is fixed to the right end of the tubular member 24 and the clevis-like member 44 fixed to the left end of the tubular member 40. Further fluid is thereafter added to the interior of the chambers formed by the flexible chamber E. F., etc., through the valve 118 until a desired fluid pressure is attained. Attention is called to the fact that the force fit connections between the parts, 40,70,80 and 94 are such that impact or load upon the device tends to force the connections together and not separate the same. Such impact or load also tends to tighten and maintain the tapered member 122 assembled on the extension 124 of the valve stem 114 rather than loosen it.

Figure 2:
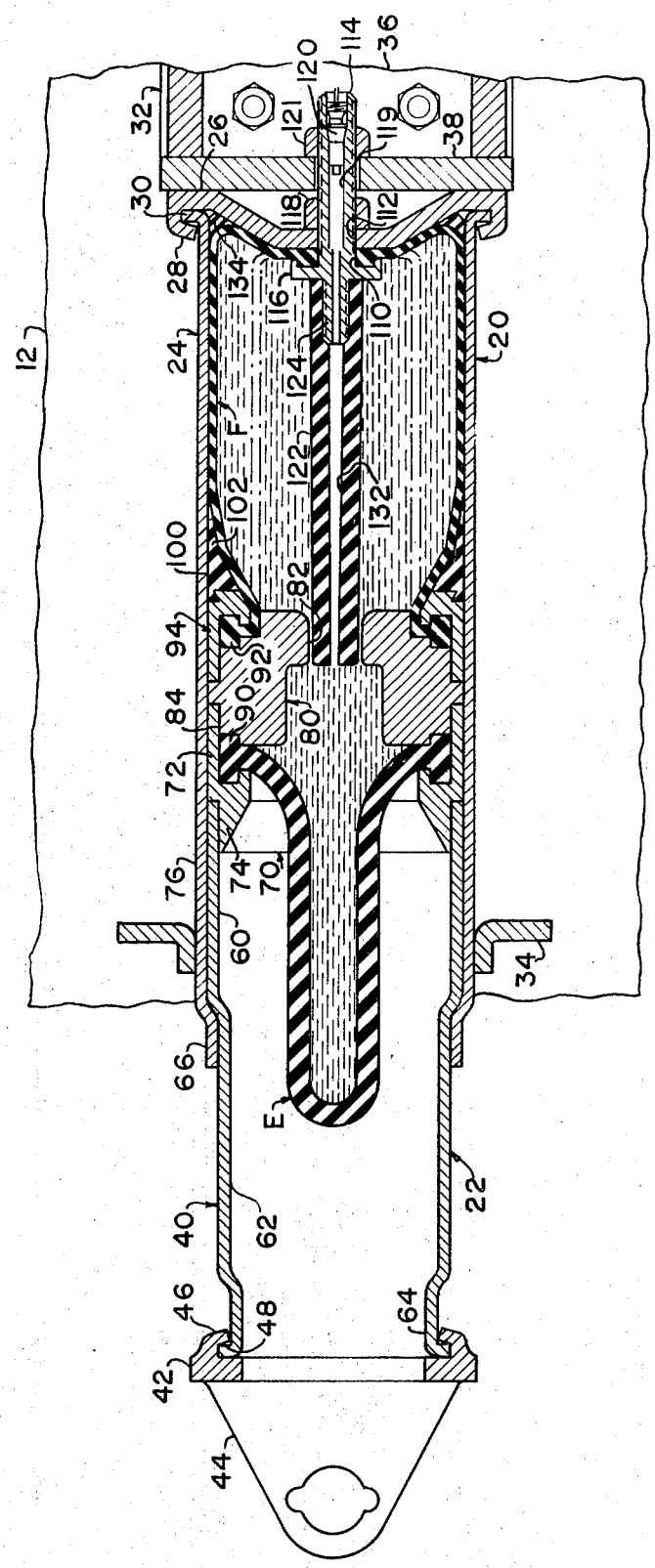
FIG. 2 is a longitudinal, vertical center sectional view, with parts in elevation, of the near energy absorbing device shown in FIG. 1.

Devices similar to the one shown in FIG. 2, the external diameter of the tubular member of which corresponds to the member 24 was approximately 3¾ inches and the other parts sized approximately in the same proportion as shown in FIG. 2, have been manufactured and successfully tested. Such devices were pressurized to approximately 40 pounds per square inch after assembly and the elasticity of the member E was such that it was only slightly increased in size from its normal size whereas the member F was caused to conform to the interior of the chamber in which it was enclosed. Such devices were subjected to repeated impacts of about 5000 pounds at 5 miles per hour without failure.

While the preferred embodiment of the invention has been described in considerable detail and as connecting a bumper structure of an automobile to an automobile chassis frame, it is to be understood that the invention may be embodied in construction other than in the particular construction shown and that it can be employed in numerous applications where it is desired to have a fluid pressure device. Alternative constructions in addition to those already mentioned might be to replace the member 122 by one of diferent size and/or of uniform diameter or to provide an entirely different way of controlling the flow of fluid from one side of the partition to the other.

From the foregoing disclosure, it will be apparent that the objects heretofore enumerated and others have been accomplished and that there has been provided improved fluid pressure devices including an hydraulic energy absorber having a completely sealed fluid chamber and simple in construction, inexpensive to manufacture, reliable in operation, and requires no maintenance.

Having thus described my invention, what I claim is:

1. In a fluid pressure device, at least two rigid members one of which is tubular and the other slidable therein, said members forming a closed chamber, a flexible tubular member adapted to contain liquid within said chamber having one end sealed to one of said rigid members and its opposite end closed, and a flexible ring-like member connected to said one of said rigid members and having a feather edge between said flexible tubular member and the other of said rigid members.

2. In a fluid pressure device, a tubular member, a rigid member slidable within said tubular member, an elastic tubular member at one side of said rigid member having one end sealed to said rigid member and its opposite end closed, and a flexible ring-like member at the same side of said rigid member as said elastic tubular member having a feather edge between said tubular member and said elastic tubular member.

3. In a fluid pressure device, first and second relatively movable assemblies having a predetermined relative normal operation position, one of said assemblies including a part orientated transversely of the direction of relative movement between the assemblies and having an aperture therethrough, a flexible tubular member adapted to contain liquid at one side of said transversely orientated part having one end sealed about said aperture therethrough and its opposite end closed, an elastic tubular member adapted to contain liquid at the opposite side of said transversely orientated part having one end sealed about said aperture therethrough and its opposite end closed and adapted to bias said assemblies to said predetermined normal operating position, and a member connected to the closed end of one of said tubular members and extending through said aperture in said transversely orientated part.

4. In a fluid pressure device, first and second telescopic assemblies, one of said assemblies including a part orientated transversely of the direction of relative movement between the assemblies and having an aperture therethrough, a flexible tubular member at one side of said transversely orientated part having one end sealed about said aperture therethrough and its opposite end closed, an elastic tubular member at the opposite side of said transversely orientated part having one end sealed about said aperture therethrough and its opposite end closed, liquid under pressure in said tubular members, and a member connected to the closed end of only one of said tubular members and extending through said aperture in said transversely orientated part limiting the flow of liquid therethrough from one of said tubular members to the other.

5. In a fluid pressure device, first and second relatively slidable telescopic assemblies at least one of which is tubular, a first member with an aperture therethrough fixed to said tubular assembly adjacent to one end thereof and closing an end thereof except for said aperture, a first flexible tubular member at one side of said first member having one end sealed about said aperture through said first member and its other end closed, an elastic tubular member at the opposite side of said first member having one end sealed about said aperture through said first member and its opposite end closed, liquid under pressure within said tubular members, and a second member connected to said closed end of only one of said flexible tubular member and extending through said aperture in said first member limiting the flow of liquid therethrough from one of said tubular members to the other.

6. In a fluid pressure device, first and second relatively slidable telescopic assemblies at least one of which is tubular, a first member fixed to said tubular assembly and closing the same except for an aperture through the member, a first elastic tubular member adapted to contain liquid at one side of said first member having one end sealed about said aperture through said first member and its other end closed, a second elastic tubular member adapted to contain liquid at the opposite side of said first member, said second elastic tubular member being less elastic than said first elastic tubular member and having one end sealed about said aperture through said first member and its opposite end closed, said second elastic tubular member being less elastic than said first elastic tubular member and adapted to bias said assemblies in one direction relative to one another, and a second member connected to said closed end of said first elastic tubular member and extending through said aperture in said first member limiting the flow of liquid therethrough from one of said elastic tubular members to the other.

7. In an energy absorber, first and second relatively slidable telescopic assemblies at least one of which is tubular, a first member fixed by a forced fit to said tubular assembly and closing the same except for an aperture through the member, a first elastic tubular member at one side of said first member having one end sealed about said aperture through said first member and its other end closed, a second elastic tubular member more elastic than said first elastic tubular member at the opposite side of said first member having one end sealed about said aperture through said first member and its opposite end closed and connected to the other of said tubular members, liquid under pressure within said elastic tubular members, and a second member connected to said closed end of said second elastic tubular member and extending through said aperture in said first member limiting the flow of liquid therethrough from one of said elastic tubular members to the other.

8. A device as claimed in claim 3 having a flexible ring-like member at the same side of said transversely orientated part as said flexible tubular member and having a feather edge between the other of said assemblies and said flexible tubular member.

9. A device as claimed in claim 4 having a flexible ring-like member at the same side of said transversely orientated part as said flexible tubular member and having a feather edge between the other of said assemblies and said flexible tubular member.

10. A device as claimed in claim 5 having a flexible ring-like member at the same side of said first member as said second elastic tubular member and having a feather edge between the other of said assemblies and said second elastic tubular member.

11. A device as claimed in claim 6 having a flexible ring-like member at the same side of said first member as said first tubular member and having a feather edge between the other of said assemblies and said first elastic tubular member.

12. A device as claimed in claim 7 having a flexible ring-like member at the same side of said first member as said second elastic tubular member and having a feather edge between the other of said assemblies and said second elastic tubular member.

13. In a fluid pressure device, first and second relatively slidable telescopic assemblies at least one of which is tubular, a first member fixed to said tubular assembly and closing the same except for an aperture through the member, a first elastic tubular member adapted to contain liquid at one side of said first member having one end sealed about said aperture through said first member and its other end closed, a second elastic tubular member adapted to contain liquid at the opposite side of said first member having one end sealed about said aperture through said first member and its opposite end closed, said second elastic tubular member being less elastic than said first elastic tubular member and adapted to bias said assemblies in one direction relative to one another, and means limiting flow of liquid through said aperture from one of said elastic tubular members to the other.

14. In an energy absorber, first and second relatively slidable telescopic assemblies at least one of which is tubular, a first member fixed by a forced fit to said tubular assembly and closing the same except for an aperture through the member, a first elastic tubular member at one side of said first member having one end sealed about said aperture through said first member and its other end closed, a second elastic tubular member more elastic than said first elastic tubular member at the opposite side of said first member having one end sealed about said aperture through said first member and its opposite end closed and connected to the other of said tubular members, liquid under pressure within said elastic tubular members, and means limiting the flow of liquid through said aperture from one of said elastic tubular members to the other.

* * * * *